March 29, 1960  H. PELPHREY  2,930,877
METHOD OF FORMING TOOTHED ELEMENTS
Filed Sept. 6, 1956  2 Sheets-Sheet 1
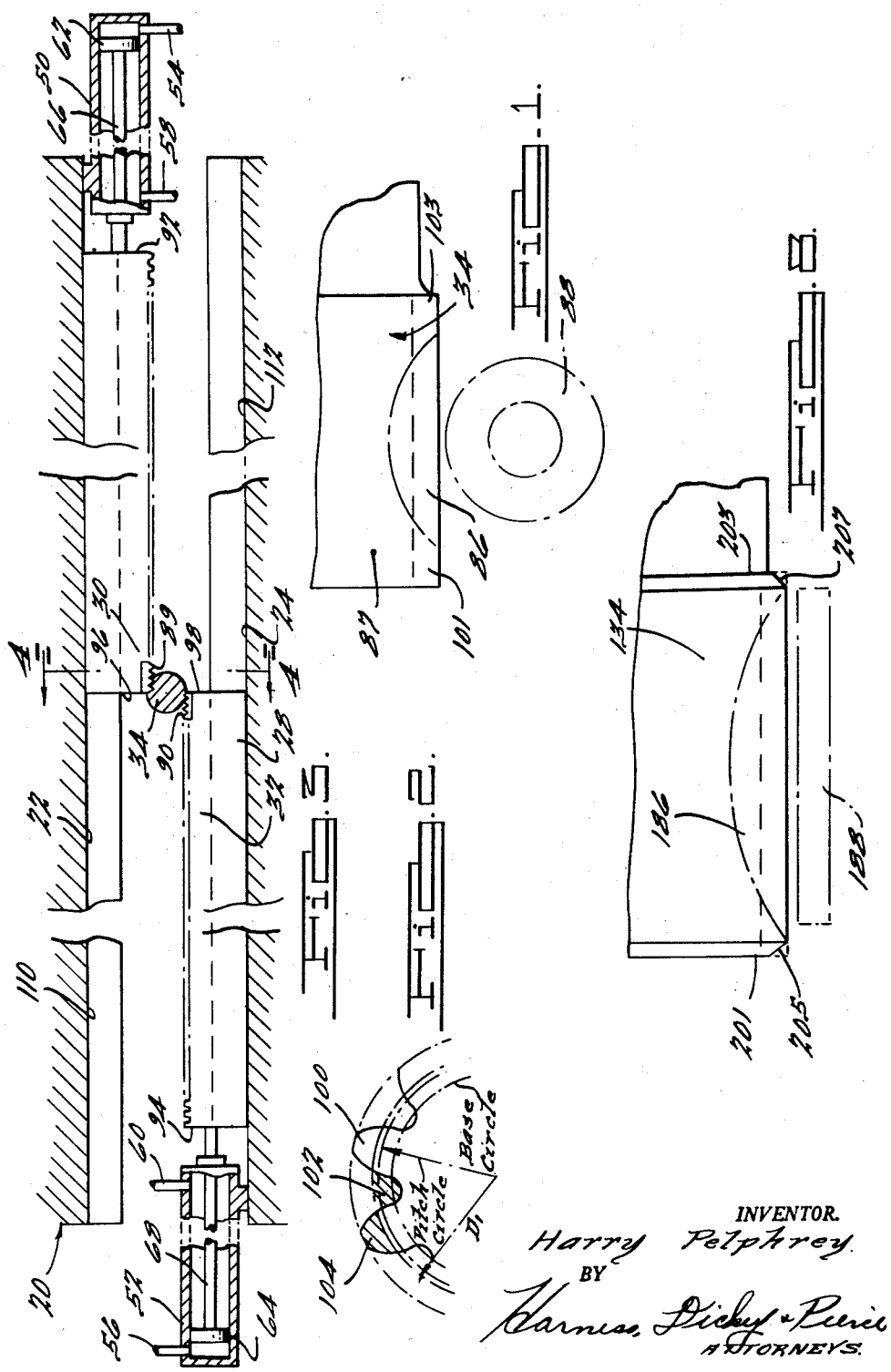
INVENTOR.
Harry Pelphrey
BY
Harness, Dickey & Pierce
ATTORNEYS.

March 29, 1960 H. PELPHREY 2,930,877
METHOD OF FORMING TOOTHED ELEMENTS
Filed Sept. 6, 1956 2 Sheets-Sheet 2
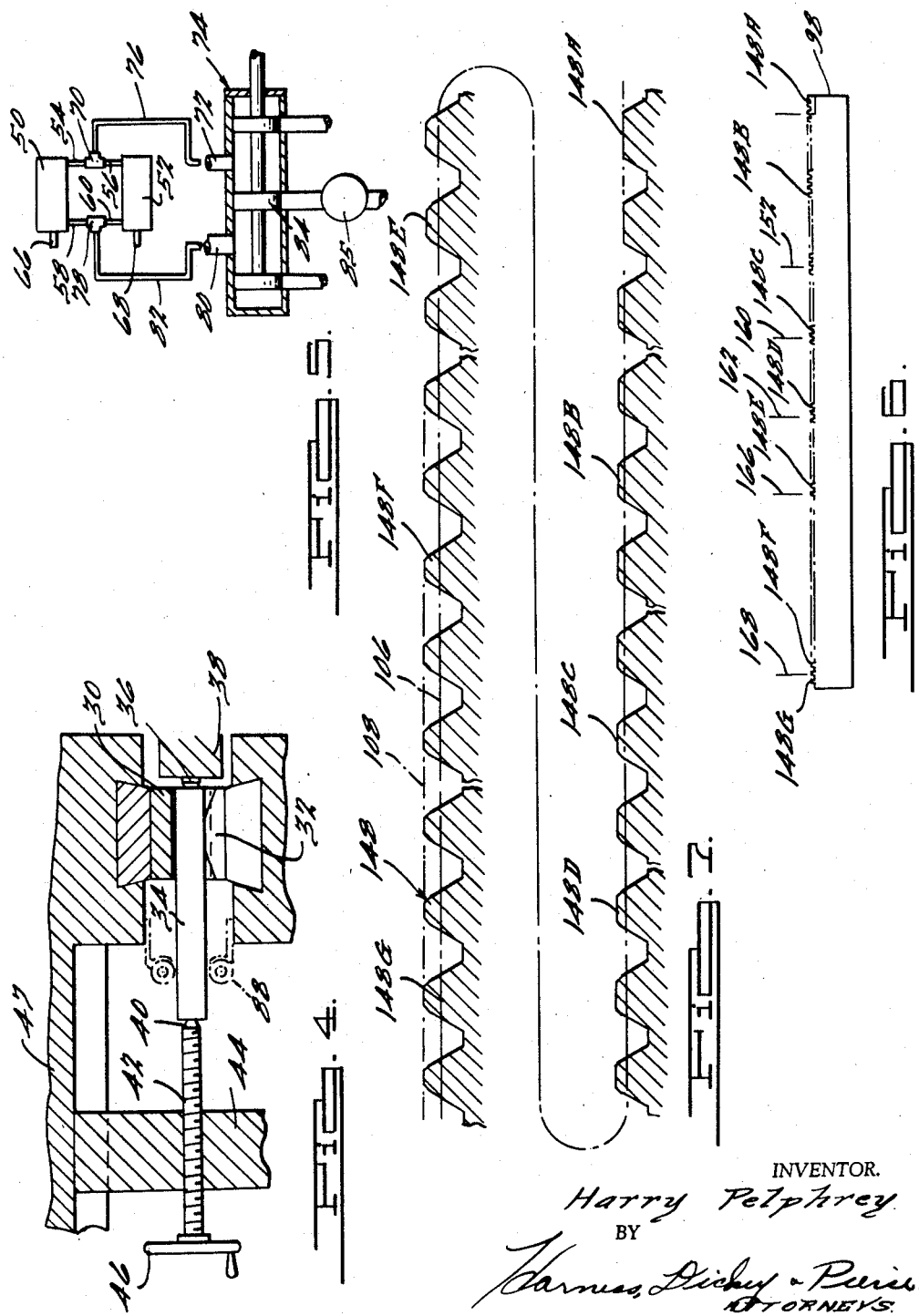
INVENTOR.
Harry Pelphrey
BY
Harness, Dickey & Pierce
ATTORNEYS

United States Patent Office 2,930,877
Patented Mar. 29, 1960

2,930,877

METHOD OF FORMING TOOTHED ELEMENTS

Harry Pelphrey, Detroit, Mich., assignor to Michigan Tool Company, Detroit, Mich., a corporation of Delaware Application September 6, 1956, Serial No. 608,381

3 Claims. (Cl. 219—7.5)

This invention relates to methods of forming toothed elements and, more particularly, to an improved method of forming teeth on toothed elements such as splines, gears, and the like.

An object of the invention is to overcome disadvantages in prior methods of forming teeth on toothed members and to provide an improved method of rapidly generating teeth on toothed members.

Another object of the invention is to provide an improved method of forming teeth on toothed elements which increases the accuracy of tooth formation throughout the entire length of the teeth.

Another object of the invention is to provide an improved method of forming teeth on toothed elements which enables the quantity production of toothed elements with a minimum of time, labor, and expense.

Another object of the invention is to provide an improved method of forming teeth on toothed elements which improves the quality of such elements and at the same time increases the speed of production thereof.

Another object of the invention is to provide an improved method of forming teeth on toothed elements which reduces the pressures to which the tooth forming tools are subjected and increases the life of such tools.

The above as well as other objects and advantages of the invention will become apparent from the following description, the appended claims, and the accompanying drawings, wherein:

Figure 1 is a schematic longitudinal view of a typical workpiece upon which teeth may be formed by means of the present invention;

Fig. 2 is a fragmentary view of a typical involute spline that can be formed by means of the present invention;

Fig. 3 is a schematic and simplified illustration, in side elevation and with parts removed, of apparatus which can be utilized to carry out the method of the present invention;

Fig. 4 is a transverse sectional view of a portion of the structure illustrated in Fig. 3, taken on the line 4—4 thereof;

Fig. 5 is a simplified and schematic fluid circuit diagram of the machine illustrated in Fig. 3;

Fig. 6 is an enlarged side elevational view of one of the tools illustrated in Fig. 3;

Fig. 7 is an enlarged longitudinal sectional view, with portions broken away, of the tool illustrated in Fig. 6; and Fig. 8 is a longitudinal and schematic view of a modified workpiece upon which teeth may be formed in accordance with the present invention.

In general, in carrying out the invention, a portion only of a section of the workpiece upon which teeth are to be formed is subjected to a localized heating effect so as to heat a generally semi-toroidal annular zone thereof to a predetermined temperature such that the metal in the semitoroidal section is in a semi-plastic state while the remaining portions of the section of the workpiece upon which teeth are to be formed are maintained at a temperature below the critical temperature of the metal. After the semi-toroidal annular zone of the workpiece has been heated, the workpiece is mounted between centers and the entire section of the workpiece upon which teeth are to be formed, including portions thereof that have not been subjected to the localized heating effect, is subjected to the action of a pair of tools having teeth conjugate to the teeth to be formed on the workpiece. The tools pressure form teeth on the periphery of the workpiece by displacing the metal of the workpiece, and the teeth may be generated without prior tooth forming operations.

Referring to the drawings, a machine generally designated 20 is illustrated which may be utilized in forming teeth on toothed elements in accordance with the present invention. The machine 20 includes a pair of longitudinally extending vertically spaced ways 22 and 24, and a pair of movable tool holders 26 and 28 are provided which are slidably mounted on the ways 22 and 24, respectively.

A pair of substantially identical rack-type tools 30 and 32 are provided which are adapted to form teeth on the periphery of a substantially cylindrical workpiece 34, the tool 30 being fixed to the holder 26 while the tool 32 is fixed to the holder 28. For the purpose of supporting the workpiece 34 after an annular zone thereof has been heated in the manner hereinafter described, the machine 20 is provided with a fixed center pin 36 which extends outwardly from the back wall 38 of the machine 20. An adjustable center pin 40 is also provided, which may, for example, be mounted on the end of an axially adjustable threaded member 42 that threadably engages a support 44, a hand wheel 46 being provided to facilitate the axial adjustment of the member 42. The support 44 may be slidably mounted on an arm 47 which projects outwardly from the machine 20, and the support 44 may be actuated so as to move the center pin 40 relative to the fixed center pin 36 by any desired or conventional means, such as a conventional piston and cylinder unit. In Figs. 3 and 4, the workpiece is shown positioned between the tools 30 and 32 after the annular semitoroidal zone of the workpiece has been heated and prior to the operation which will form the teeth on the periphery of the workpiece 34. The workpiece 34 is supported by the centers 36 and 40 so that the workpiece is permitted to rotate freely about its longitudinal axis when tangentially directed forces are applied to the workpiece by the tools 30 and 32.

The tools 30 and 32 are substantially identical in construction, each of the tools being provided with teeth 48 which are disposed in spaced confronting relationship with respect to the teeth of the other tool.

The machine 20 is also provided with means for simultaneously moving the tools 30 and 32 in opposite directions. This means is illustrated including a pair of substantially identical pressure cylinders 50 and 52 having pressure ports 54 and 56, respectively, at one end and pressure ports 58 and 60, respectively, at the opposite end thereof. Pistons 62 and 64 are provided in the cylinders 50 and 52, the pistons having piston rods 66 and 68. The rod 66 is fixed to the trailing end of the holder 26, while the rod 68 is fixed to the trailing end of the holder 28. Suitable valving is provided for actuating the pistons 62 and 64 and for synchronizing their operation so that the tools 30 and 32 move at the same instant and at the same velocity in opposite directions. As shown in Fig. 5, the ports 54 and 56 of the cylinders 50 and 52 are connected together by a T-connector 70 and to the port 72 of a valve 74, while the ports 58 and 60 are connected together by a T-connector 78 and to the port 80 of the valve 74 by a line 82. A three-land spool valve 84 is provided in the valve 74, the spool valve 84 being shiftable in one direction to connect the ports 54 and 56 to a source of pressure, such as a pump 85, and to connect the ports 58 and 60 to a tank. The spool valve 84 is also adapted to be shifted longitudinally in the opposite direction so as to connect the ports 54 and 56 to tank and the ports 58 and 60 to the source of fluid pressure.

In forming teeth, splines, and the like on a workpiece, an annular zone 86 only of the section 87 of the workpiece 34 upon which teeth are to be formed is subjected to the localized heating effect of an induction heating element 88 carried by the machine 20 at a position near, but spaced from the racks 30 and 32. The heating element 88 is adapted to heat the zone 86 in a generally semi-toroidal pattern to a temperature such that the metal within the semi-toroidal pattern is in a semi-plastic condition. This temperature is referred to throughout the specification and claims as the critical temperature. The remaining portions of the workpiece are maintained at a temperature below this critical temperature. After the semi-toroidal zone 86 of the workpiece has been heated to an elevated temperature in the manner previously described, the workpiece is mounted on the centers 36 and 40 so that the workpiece is permitted to be rotated by the tools 30 and 32, and the tools 30 and 32 are initially disposed in the positions shown in Figs. 3 and 4. The spool valve 84 is then moved to the left, as viewed in Fig. 5, to connect the ports 54 and 56 to the source of fluid pressure and the ports 58 and 60 to tank so that the tool 30 moves to the left, as viewed in Fig. 3, while the tool 32 moves simultaneously to the right. The spacing between the working faces 89 and 90 of the tools 30 and 32 is less than the diameter of the workpiece 34 and the shape of the faces 89 and 90 is pressed or conjugated on the periphery of the workpiece 34. The end of the stroke is reached when the trailing ends 92 and 94 of the tools 30 and 32 pass over the workpiece, after which the workpiece may be removed from the centers 36 and 40 and the spool valve 84 moved to the right, as viewed in Fig. 5, to return the tools 30 and 32 to their starting positions, as shown in Fig. 3, wherein the leading ends 96 and 98 thereof are adjacent the workpiece 34. A new workpiece may then be heated in the manner previously described, mounted between the centers, and thereafter subjected to the actions of the tools 30 and 32.

In rolling teeth of the desired shape into the surface of the workpiece 34, the material from which the workpiece is made, as for example, wrought steel, will flow adjacent the surface in radial, tangential, and axial directions. However, since the material at the ends 101 and 103 of the section 87 of the workpiece upon which teeth are being rolled is below the critical temperature and in a non-plastic condition while the material within the semi-toroidal zone 86 is at an elevated temperature above the critical temperature and in a semi-plastic condition, the material which is relatively cold at the ends of the section of the workpiece upon which teeth are to be formed will resist the tendency of the material to flow in an axial direction while the tools 30 and 32 will confine the flow of material in the radial and tangential directions. Consequently, the tendency of the metal at the ends of the teeth to mushroom is substantially reduced and the accuracy of tooth formation is maintained throughout the entire length of the teeth. Furthermore, the rolling pressures which are exerted on the tools are reduced, thereby increasing the tool life. Grooves of less than the original diameter of the workpiece and teeth greater than the original diameter are thus pressure formed on the workpiece. When the final form of the workpiece is known and must be accurately maintained, this flow of material may be taken into account in selecting the initial diameter of that portion of the workpiece which is subjected to the action of the tools 30 and 32.

In Figure 8, a workpiece 134 is illustrated, the initial configuration of which is modified with respect to the workpiece 34 to further compensate for the tendency of the metal at the ends of the teeth to mushroom during the tooth forming operation. The ends 201 and 203 of the section of the workpiece upon which teeth are to be formed are initially chamfered, as at 205 and 207, prior to the tooth forming operation. During the tooth forming operation, the material from which the workpiece is made will tend to flow in an axial direction as well as in radial and tangential directions, and this axial flow of material may be taken into account in selecting the angle and depth of the chamfered surfaces. The volume of metal removed from the ends of the workpiece 134 during the chamfering operation is selected so that the volume of metal displaced in an axial direction during the tooth forming operation is equal to the volume of metal removed by the chamfering operation with the result that mushrooming of the metal at the ends of the teeth is prevented and the accuracy of tooth formation is maintained throughout the entire length of the teeth. The volume of metal in the heated annular zone of the workpiece may also be varied to control the flow of metal in an axial direction on the workpiece. For example, the zone 186 may be heated by an induction heating element 188 so as to extend for substantially the entire distance between the chamfered surfaces 205 and 207, or the length of the zone and the maximum depth thereof may be reduced in accordance with the particular flow characteristics of the workpiece upon which teeth are formed.

In Figure 2, a common and important shape is illustrated that may be rolled on either of the workpieces 34 or 134 in accordance with the present invention. A portion of a cross section of a workpiece is shown in Fig. 2 in finished form with involute teeth 100 thereon. Since metal is not removed in the rolling operation, the diameter of the workpiece prior to the rolling operation is not either the final outside diameter or the root diameter and it is only by chance that it can be properly the pitch diameter. The rolling diameter $D_1$ of the workpiece 34 is selected so that the area 102 of displaced material inside the $D_1$ periphery is equal to the area 104 of tooth material on a greater diameter than $D_1$. The diameter $D_1$, or substantially this diameter, determines the pitch lines for the rack-type tools 30 and 32, the pressure angle or obliquity of the teeth of the tools being the angle whose cosine is $D/D_1$ multiplied by the cosine of the pressure angle at pitch diameter of the teeth 100, where D is the pitch diameter of the workpiece and the base pitch of the tools and the workpiece is identical.

The whole depth of at least some of the last teeth on the tools which engage the workpiece is preferably the same as that of the workpiece so that such teeth are fully conjugate to the workpiece, the tools 30 and 32 being spaced apart so that at least near the trailing ends 92 and 94 thereof their working faces provide a clearance equal to the root diameter of the workpiece less approximately three or four thousandths of an inch to compensate for the elasticity of the members and the compression of oil films under rolling pressure. At the present time a linear pitch line velocity for rack-type tools of about three hundred to four hundred and fifty inches per minute is believed desirable, three hundred and seventy five inches per minute being preferred. If it is desired to positively drive the workpiece, as for example, through gearing rather than by the tools 30 and 32, although this is not preferred, the velocities of the workpiece and the tools should, of course, be the same. Only one pass of the tools relative to the workpiece is preferred with no reversal of direction during the working stroke.

The spacing of the working faces 89 and 90 of the tools 30 and 32 is regulated so that the depth of the impressions made in the workpiece 34 gradually increases as the rolling operation proceeds, and the faces 89 and 90 approach closer together in a plane through the centers 36 and 40 as the length of the stroke increases. It is preferred that the amount of such approach be within the range of .0015–.004 inch per inch of linear tool movement, with about .002 preferred. This approach may also be regarded as .0015–.004 inch total feed of the workpiece across its diameter per inch of tool movement relative thereto. The convergence of the tool faces toward each other with increasing length of stroke is preferably accomplished by tapering each tool uniformly, e.g., about .001 inch per inch per tool, although the taper may be provided in other ways, such as by tapering only one tool and suitably mounting the workpiece to avoid eccentricity. The taper can, for example, be obtained by inclining the pitch lines of the tool teeth, by gradually increasing the height of the tool teeth while holding the pitch line level, or by a combination of the two methods.

By way of illustration, the lower tool 32 is shown in Figs. 6 and 7, it being understood that the upper tool is preferably substantially identical to the lower tool. The pitch line 106 of the tool is shown as being parallel to a reference line 108 that is parallel to the surfaces 110 and 112 of the ways 22 and 24, respectively. Throughout the entire length of the tool, a taper is provided by gradually removing the addendum of the teeth 148, as, for example, by grinding the teeth 148 on a uniform taper. The top lands of the teeth 148A between the leading edge 98 of the tool 32 and a reference plane 152 may be located substantially on the pitch line, as shown, or may, for example, be disposed a half to a few thousandths of an inch above the pitch line. The teeth 148A are relatively shallow but rather wide and have relatively sharp corners. Between the reference plane 152 and the leading end 98, the side portions of the tools may be relieved so that only the central portions of the teeth 148A initially engage the workpiece, the engagement being effected at substantially the midsection of the portion of the workpiece upon which teeth are to be formed. Such a construction substantially prevents the excess displacement of metal initially and prevents the formation of ridges, grooves, and other marks on the teeth formed by the tools. Such a construction also materially assists in effecting proper spacing of the teeth in the workpiece since a relatively small volume of metal is initially displaced by the entering ends of the tools. The teeth 148B between the reference plane 152 and the reference plane 160 may, if desired, be provided with a small chamfered corner, e.g., .003 inch on 30 degrees to the horizontal or length of the tool. This chamfer may be gradually increased as the height of the tool increases to a size which is somewhat larger than the final average between the planes 160 and 162 (teeth 148) may be .005 inch on 30 degrees, between planes 162 and 164 (teeth 148B) may be .006 inch on 30 degrees; and between planes 164 and 166, teeth 148E) may be .007 inch on 30 degrees. The teeth in each of these groups may be approximately equal in number, the number of course, depending on the total taper and circular pitch required. Teeth 148F between the planes 166 and 168 give final form to the teeth on the workpiece and are full size and fully conjugate but have a chamfer of .005 inch on 30 degrees. The number of teeth 148F is the same on both the tools 30 and 32. The teeth 148G, which may, for example, be four or five in number, may be relieved by grinding the flanks off a total of about .0005 to .003 inch per tooth as compared with the the teeth 148F, from the reference plane 168 to the trailing end 94 of the tool. The sharp corners on the teeth 148A tend to grip the workpiece and rotate it. In addition, the changing shape of the teeth substantially corresponds to the progressive changes to be made in the surface of the workpiece as the teeth are formed. It will be noted that, if desired, the tools will form teeth immediately adjacent a shoulder without requiring undercutting of the workpiece for clearance purposes. The relief of the last four or five teeth substantially eliminates seams, lines, and other marks that may be formed on the workpiece at the end of the stroke due to the decreased total area of contact between the tools and the workpiece, and a resulting tendency to increase or unbalance the forces on the workpiece.

What is claimed is:

1. The method of forming teeth or the like on a section of predetermined length of a cylindrical member having an axis of rotation which comprises the steps of heating to a predetermined depth an annular portion only of said member intermediate the ends of said section upon which teeth are to be formed, and thereafter gradually rotating said member and simultaneously forcing a succession of tool teeth radially into the entire length of said section including both heated and unheated portions thereof so as to form teeth on said member extending for the entire length of said section while maintaining said axis fixed.

2. The method of forming teeth or the like on a section of predetermined length of a cylindrical member having an axis of rotation which comprises the steps of initially inductively heating an annular portion intermediate the ends of said section to a predetermined depth, and thereafter gradually forcing a succession of tool teeth radially into the entire length of said section including both heated and unheated portions thereof while said member rolls about its axis tangentially to said tool teeth so as to form teeth extending for the entire length of said section while maintaining said axis fixed and the lengthwise position of said member on said axis fixed.

3. The method of forming teeth or the like on the outside surface of a cylindrical member, which comprises the steps of initially inductively heating an annular portion only of a section of predetermined length of said member to a predetermined critical temperature and thereafter rolling said member, including portions thereof which have been heated to said critical temperature and portions which have not been heated to said critical temperature, in successive contact with a series of conjugate teeth on a tool, gradually feeding said teeth simultaneously into said heated and unheated portions, thereafter simultaneously rolling said heated and unheated portions in contact with a series of substantially identical conjugate tool teeth without said radial feeding so as to form teeth extending for the entire length of said section.

References Cited in the file of this patent

UNITED STATES PATENTS

| 440,763 | Simonds | Nov. 18, 1890 |
| 446,934 | Simonds | Feb. 24, 1891 |
| 1,668,442 | Wineman | May 1, 1928 |
| 2,464,658 | Stiven | Mar. 15, 1949 |
| 2,472,261 | Mueller | June 7, 1949 |

FOREIGN PATENTS

| 884,944 | Germany | July 30, 1953 |
| 898,436 | Germany | Nov. 30, 1953 |

OTHER REFERENCES

Machinery, October 1948, pp. 152–156.
American Machinist, December 7, 1953.